M. A. GANIARD & E. R. BAILEY.
ADJUSTABLE FLEXIBLE BEARING.
APPLICATION FILED APR. 27, 1908.
929,581.
Patented July 27, 1909.
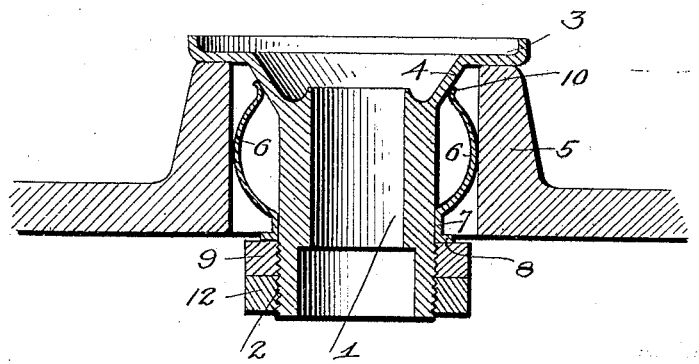
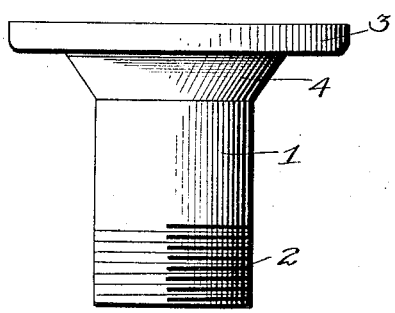
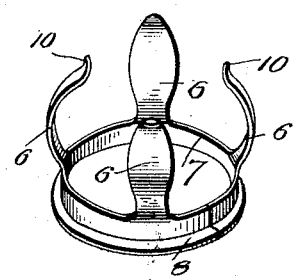
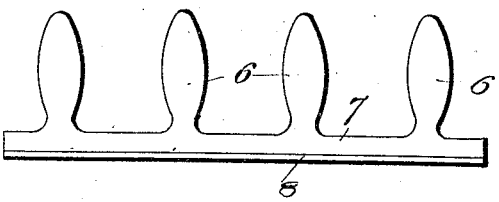
Witnesses
Inventors
M. A. Ganiard
E. R. Bailey
By
Attorneys

UNITED STATES PATENT OFFICE.

MYRON A. GANIARD AND EDGERLY R. BAILEY, OF CLARINDA, IOWA.

ADJUSTABLE FLEXIBLE BEARING.

No. 929,581.  Specification of Letters Patent.  Patented July 27, 1909.

Application filed April 27, 1908. Serial No. 429,419.

*To all whom it may concern:*

Be it known that we, MYRON A. GANIARD and EDGERLY R. BAILEY, citizens of the United States, residing at Clarinda, in the county of Page and State of Iowa, have invented certain new and useful Improvements in Adjustable Flexible Bearings; and we do declare the following to be a full, clear, and exact description of the invention, such as will enable others skilled in the art to which it appertains to make and use the same.

This invention relates to improvements in flexible bearing.

The object of the invention is to provide a bearing of this character adapted to be yieldingly or flexibly supported in a suitable frame or casing, and having means whereby the flexibility of the same may be adjusted or regulated.

With this and other objects in view, the invention consists of certain novel features of construction, combination and arrangement of parts as will be described and particularly pionted out in the appended claim.

In the accompanying drawing, Figure 1 is a vertical sectional view of a bearing constructed and arranged in accordance with the invention; Fig. 2 is a side view of the bearing sleeve; Fig. 3 is a perspective view of the spring which yieldingly supports the bearing in operative position; and Fig. 4 is a plan view of the spring showing the manner in which the same is constructed.

Referring more particularly to the drawing, 1 denotes the bearing having a centrally disposed passage to receive a shaft or spindle. The bearing 1 is here shown as provided on its lower end with exterior screw threads, 2, and on its upper end is provided with a radially disposed flange, 3, which is connected to the main portion of the bearing by an inclined shoulder, 4. The bearing is here shown as engaged with a suitable supporting frame or casing, 5, with which the flange 3 is engaged to support the bearing in an operative position.

Between the inner wall of the frame or casing 5 and the outer wall of the bearing 1 is formed an annular space which provides for the lateral movement or tilting of the bearing in the frame, and in said space is arranged a flexible connection which is here shown and is preferably in the form of a series of spring metal arms 6, which are connected together at their lower ends by an integral connecting base strip 7, the lower edge of which is turned outwardly and forms a flange, 8, which is adapted to engage a tension regulating nut, 9, screwed onto the lower threaded end of the bearing as shown.

The connecting strip 7 and arms 6 are preferably cut or struck out from a sheet of metal and the arms 6 are curved or bowed outwardly, as shown. The strip 7 is bent into the form of a ring and is adapted to fit or closely engage the outer walls of the bearing 1 above the nut, 9, as shown. The spring arms 6 are disposed around the bearing with their bowed portion in engagement with the inner wall of the opening in the frame or casing, 5, while their upper ends are engaged with the inclined shoulder 4, which connects the flange 3 with the body of the bearing. The upper ends of the spring arms 6 are preferably turned outwardly as shown at 10 to facilitate the engagement thereof with the inclined shoulder 4. When the spring arms have been thus engaged with the bearing, the latter is yieldingly held or supported in the frame or casing 5 against the tension or pressure of the spring arms, 6, which tension or pressure is regulated by means of the nut, 9, and the engagement of the upper ends of the arms with the inclined shoulder 4 on the bearing, thereby providing for a greater or less rigid support or connection between the bearing and its frame or casing. If desired, we may employ a jam or locking nut, 12, adapted to be screwed onto the threaded end of the bearing 1 and into engagement with the adjusting nut, 9, whereby the latter is locked in its adjusted position.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus particularly described our invention, what we claim as new and desire to secure by Letters-Patent is:

In a device of the character described, a cylindrical frame, a cylindrical bearing loosely mounted therein, an inclined shoulder at the upper end of said bearing, a lateral flange formed at the outer end of said shoulder and bearing on said frame, a resilient member to hold the bearing against rotation, said member comprising an annular base provided with an annular outwardly extending flange and a series of upwardly projecting outwardly bowed spring arms which extend from the base and fit against the inner surface of the frame and are provided at their outer ends with outwardly bent portions which fit against the inclined shoulder of the bearing whereby the latter is yieldingly held against rotation, an adjusting nut screwing on the lower end of the bearing against the base flange of the resilient member, and a jam nut to lock said adjusting nut, the resilient member being formed from a single strip of metal bent into the required form and being separate from and movable independently of the adjusting nut.

In testimony whereof we have hereunto set our hands in presence of two subscribing witnesses.

MYRON A. GANIARD.
EDGERLY R. BAILEY.

Witnesses:
MINNIE POTTS,
J. E. AUMAN.